United States Patent
Toyohara et al.

(10) Patent No.: US 8,607,214 B2
(45) Date of Patent: *Dec. 10, 2013

(54) DATA PROCESSING SYSTEM RUNNING ON A PLURALITY OF OPERATING SYSTEMS (OS) AND ENABLING A CHANNEL DEVICE TO SIMULTANEOUSLY PERFORM PROCESSING ASSOCIATED WITH THE PLURALITY OF OPERATING SYSTEMS

(75) Inventors: Yoshihiro Toyohara, Hadano (JP); Tetsuhiro Goto, Hadano (JP); Megumu Hasegawa, Hadano (JP); Takeshi Shigeno, Hadano (JP)

(73) Assignee: Hitachi Ltd., Tokyo (JP)

( * ) Notice: Subject to any disclaimer, the term of this patent is extended or adjusted under 35 U.S.C. 154(b) by 468 days.

This patent is subject to a terminal disclaimer.

(21) Appl. No.: 12/562,562

(22) Filed: Sep. 18, 2009

(65) Prior Publication Data

US 2010/0011349 A1    Jan. 14, 2010

Related U.S. Application Data (63) Continuation of application No. 11/025,916, filed on Jan. 3, 2005, now Pat. No. 7,610,581.

(30) Foreign Application Priority Data

Jan. 8, 2004    (JP) ................................. 2004-002577

(51) Int. Cl.
    *G06F 9/44*    (2006.01)
(52) U.S. Cl.
    USPC ............... 717/168; 717/171; 710/33; 710/36; 710/37; 710/38

(58) Field of Classification Search
    USPC .................. 717/168–178; 710/10, 33, 36–38
    See application file for complete search history.

(56) References Cited

U.S. PATENT DOCUMENTS

| 3,302,177 A | | 1/1967 | Bina | |
| 4,396,984 A | * | 8/1983 | Videki, II | ........................ 710/38 |

(Continued)

FOREIGN PATENT DOCUMENTS

| JP | 06-214823 | 8/1994 |
| JP | 2002-222110 | 8/2002 |

OTHER PUBLICATIONS

Nordstrom, G.G.; "I/O interfacing for the transputer," System Theory, 1991. Proceedings., Twenty-Third Southeastern Symposium, pp. 488-495, Mar. 10-12, 1991.*

(Continued)

*Primary Examiner* — Wei Zhen
*Assistant Examiner* — Satish Rampuria
(74) *Attorney, Agent, or Firm* — Mattingly & Malur, PC (57) ABSTRACT

In a data processing system which runs a plurality of operating systems, a channel device can be shared by the plurality of operating systems. In addition, a channel device which supports port multiplexing can also be shared by a plurality of operating systems. The channel device includes a plurality of IDs each indicating that the channel device is a medium for performing input/output processing, and an input/output processing controller for assigning one operating system to each of the IDs, and controlling a data transfer independently for each ID to control a plurality of data transfers. Further, in a channel device which has a plurality of ports, an input/output processing controller is provided for assigning an operating system to each of the ports, and transferring data independently for each port to control the plurality of ports.

1 Claim, 6 Drawing Sheets

(56) References Cited

U.S. PATENT DOCUMENTS

| | | | |
|---|---|---|---|
| 4,403,288 A * | 9/1983 | Christian et al. ................... 710/5 |
| 4,459,661 A * | 7/1984 | Kaneda et al. ................ 718/100 |
| 5,894,583 A | 4/1999 | Johnson et al. |
| 5,954,796 A * | 9/1999 | McCarty et al. ............. 709/222 |
| 6,014,383 A * | 1/2000 | McCarty ....................... 370/453 |
| 6,343,324 B1 * | 1/2002 | Hubis et al. ................... 709/229 |
| 6,453,392 B1 * | 9/2002 | Flynn, Jr. ...................... 711/151 |
| 7,493,416 B2 * | 2/2009 | Pettey ........................... 709/250 |
| 2005/0157725 A1 * | 7/2005 | Pettey ........................... 370/392 |
| 2005/0172041 A1 * | 8/2005 | Pettey ............................... 710/1 |
| 2005/0172047 A1 * | 8/2005 | Pettey ............................. 710/20 |
| 2006/0095640 A1 | 5/2006 | Mimatsu et al. |

OTHER PUBLICATIONS

Snively, R.; , "Implementing a Fibre Channel SCSI transport," Compcon Spring '94, Digest of Papers, pp. 78-82, Feb. 28-Mar. 4, 1994.*

Adlung et al., FCP for the IBM eServer zSeries systems: Access to distributed storage, IBM, 2002, pp. 487-502.*

Snively, R., "Implementing a Fibre Channel SCSI transport," Compcon Spring '94, Digest of Papers, pp. 78-82, Feb. 28-Mar. 4, 1994.*

Calvert, N.M.; Sibley, M.J.N.; Unwin, R.T.; Cryan, R.A.; Garrett, I., "Optimal filtering of digital PPM transmitted over optical fibre channels," Electronic Filters, IEE Colloquium, pp. 5/1-5/5, Jun. 9, 1989.*

I. Adlung et al, FCP for the IBM eServer zEries systems: Access to distributed storage, IBM J. Res & Dev vol. 46, pp. 487-502, Date:2002.

Fibre Channel for Mass Storage, Ralph Thornburg, Publisher: Prentice Hall, Apr. 30, 1999, pp. 1-14.

S. Emerson, Evaluation of a data communication model for switched fibre channel, IEEE, 1995, pp. 485-493.

Mengjou Lin et al, Performance of high-speed network I/O subsystems: case study of a fibre channel network, IEEE, 1994, pp. 174-183.

* cited by examiner

CHANNEL CONTROL REGISTER

FIG. 4

MEMORY REQUEST FORMAT

| CHANNEL DEVICE NUMBER | LPAR#1 | LPAR#2 |
|---|---|---|
| 1 | 1 | 1 |
| 2 | 1 | 0 |
| 3 | 0 | 1 |

FIG. 8

| CHANNEL CONTROL REGISTER | DATA TRANSFER BUFFER NUMBER | LPAR NUMBER | AL-PA |
|---|---|---|---|
| 1 | 1 | 1 | 0x01 |
| 2 | 2 | 2 | 0x02 |

FIG. 9

| TARGET ID | WWPN# |
|---|---|
| 0 | 0x300 |

FIG. 10

| TARGET ID | WWPN# | AL-PA |
|---|---|---|
| 0 | 0x300 | 0xce |

DATA PROCESSING SYSTEM RUNNING ON A PLURALITY OF OPERATING SYSTEMS (OS) AND ENABLING A CHANNEL DEVICE TO SIMULTANEOUSLY PERFORM PROCESSING ASSOCIATED WITH THE PLURALITY OF OPERATING SYSTEMS

This application is a continuation application of U.S. Ser. No. 11/025,916, filed Jan. 3, 2005, the entirety of which is incorporated herein by reference.

INCORPORATION BY REFERENCE

The present application claims priority from Japanese application JP2004-002577 filed on Jan. 8, 2004, the content of which is hereby incorporated by reference into this application.

BACKGROUND OF THE INVENTION

The present invention relates to a data processing system which transfers data, and more particularly, to a data processing system which runs a plurality of operating systems (OS) thereon, and enables a channel device to simultaneously perform processing associated with the plurality of operating systems.

Conventionally, a main frame has supported an LPAR (Logical Partition) function for running a plurality of operating systems on one system under a control program.

In recent years, the LPAR function is supported not only by main frames but also by open servers. For supporting the LPAR function in an open server, a plurality of operating systems are required to share one channel device, because of a limitation in the number of slots which can be connected to channel devices involved in input/output processing. However, for a main frame which permits a plurality of operating systems to share a channel device as mentioned above, channel devices supported by the main frame tend to conform to specifications unique to the vendor of the main frame. Therefore, the sharing of a channel device by a plurality of operating systems is difficult for open servers which support channel devices conforming to the industry standard.

One of industry standard channel devices supported by open servers as mentioned above is Fibre Channel which has been developed by several vendors and conforms to a standard created by ANSI (American National Standards Institute). A protocol frequently used in Fiber Channel is FCP (Fibre Channel Protocol) which supports an SCSI (Small Computer System Interface) architecture. Since FCP does not define data in a frame for identifying an LPAR number or an operating system, difficulties are experienced in the sharing of a channel device by a plurality of operating systems. Also, for inserting a channel device, such as that conforming to Fibre Channel, into a slot of an open server for connection to a host processor in accordance with the industry standard, a PCI (Peripheral Component Interchange) bus, laid out by PCI-SIG, has been widely used in such a configuration. The PCI bus generally includes a PCI configuration register for one medium such as a channel device, and has only one control register for controlling the medium. Thus, for the foregoing reason, difficulties are also experienced in sharing a channel device by a plurality of operating systems.

In opposition to the industry standard channel device as described above, "FCP for the IBM eServer zSeries systems: Access to distributed storage" (IBM J. Res. & Dev. 46, No. 4/5 487-502) describes an exemplary channel device which can be shared by a plurality of operating systems. This channel device merely has one WWPN or Worldwide unique Port Name which is a channel device identifier associated with Fibre Channel, and appears as one port in a Fibre Channel network. While this limitation permits the channel device to be shared by a plurality of operating systems, only one operating system is allowed to access one Fibre Channel device identified by LUN (Logical Unit Number) at a certain arbitrary time. Also, the channel device is not inserted into a slot of the PCI bus, but into a bus slot of a server, which conforms to the specifications unique to the vendor of the server.

Further, in recent years, port multiplexing has been developed for connecting a plurality of ports to a single slot in order to effectively utilize slots of a server. However, the aforementioned prior art technique is not directed to a channel device which implements the port multiplexing.

SUMMARY OF THE INVENTION

The prior art technique described above has a limitation in that even if a plurality of operating systems can share a single channel device, only one operating system is allowed to access one Fibre Channel device identified by LUN at a certain arbitrary time. In addition, the Fibre Channel device is not inserted into a bus slot conforming to standard specifications such as the PCI bus supported by the open servers.

Specifically, a first challenge is to allow a plurality of operating systems to access a single Fibre Channel device identified by LUN at a certain arbitrary time. A second challenge is to also support buses conforming to standard specifications such as PCI, and to allow a plurality of operating systems to share one channel device. Further, a third challenge is to permit a plurality of operating systems to share a channel device which has a plurality of ports connected to a single slot, accomplished by the port multiplexing for effectively utilizing slots of a server.

A channel device according to the present invention includes a plurality of identifiers or ID each for indicating that the channel device is a physical medium for performing input/output processing, and input/output control means for assigning an operating system to each of the identifiers, controlling the transmission and reception of data independently for each of the identifiers, and controlling the transmission and reception of a plurality of the data.

The channel device also includes a plurality of control registers which can be read and written by the operating systems such that the operating systems can control the channel device in order to perform input/output processing between the operating systems and the channel device, and also includes means for assigning each of the control registers to one operating system.

Further, a channel device, which has a plurality of ports for transmitting/receiving data, includes input/output processing control means for assigning one operating system to each of the ports to control the plurality of ports.

The present invention provides a channel device which can simultaneously execute I/O processing from a plurality of operating systems.

The present invention also provides a port-multiplexed channel device which can be shared by a plurality of operating systems.

DESCRIPTION OF THE EMBODIMENTS

In the following, one embodiment of the present invention will be described with reference to the accompanying drawings.

Figure 2:
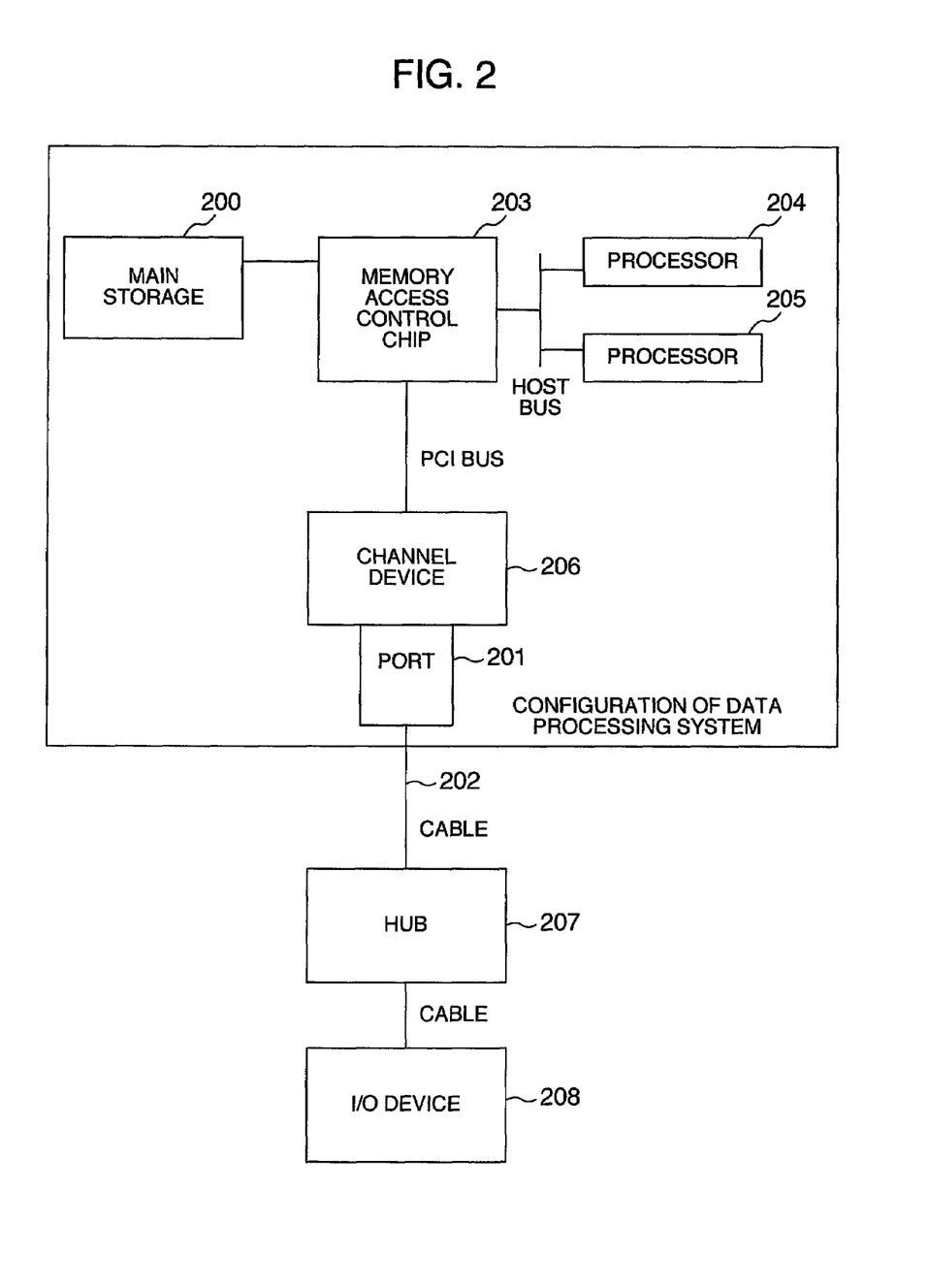
FIG. 2 is a block diagram illustrating an exemplary configuration of the data processing system.

FIG. 2 illustrates an exemplary configuration of a data processing system. A memory access control chip 203 mainly controls accesses to a main storage (MS) 200 from processors 204, 205 or a channel device 206. The memory access control chip 203 and channel device 206 are interconnected through a PCI bus, while the memory access control chip 203 and processors 204, 205 are interconnected through a host bus conforming to the specifications unique to the system. The channel device 206 has one port which is connected to an I/O device 208 through a hub 207. The data processing system, which supports the LPAR function, assigns 2 MB of the main storage 200 to each LPAR, such that an operating system on each LPAR uses the assigned 2 MB of memory for operations.

Figure 1:
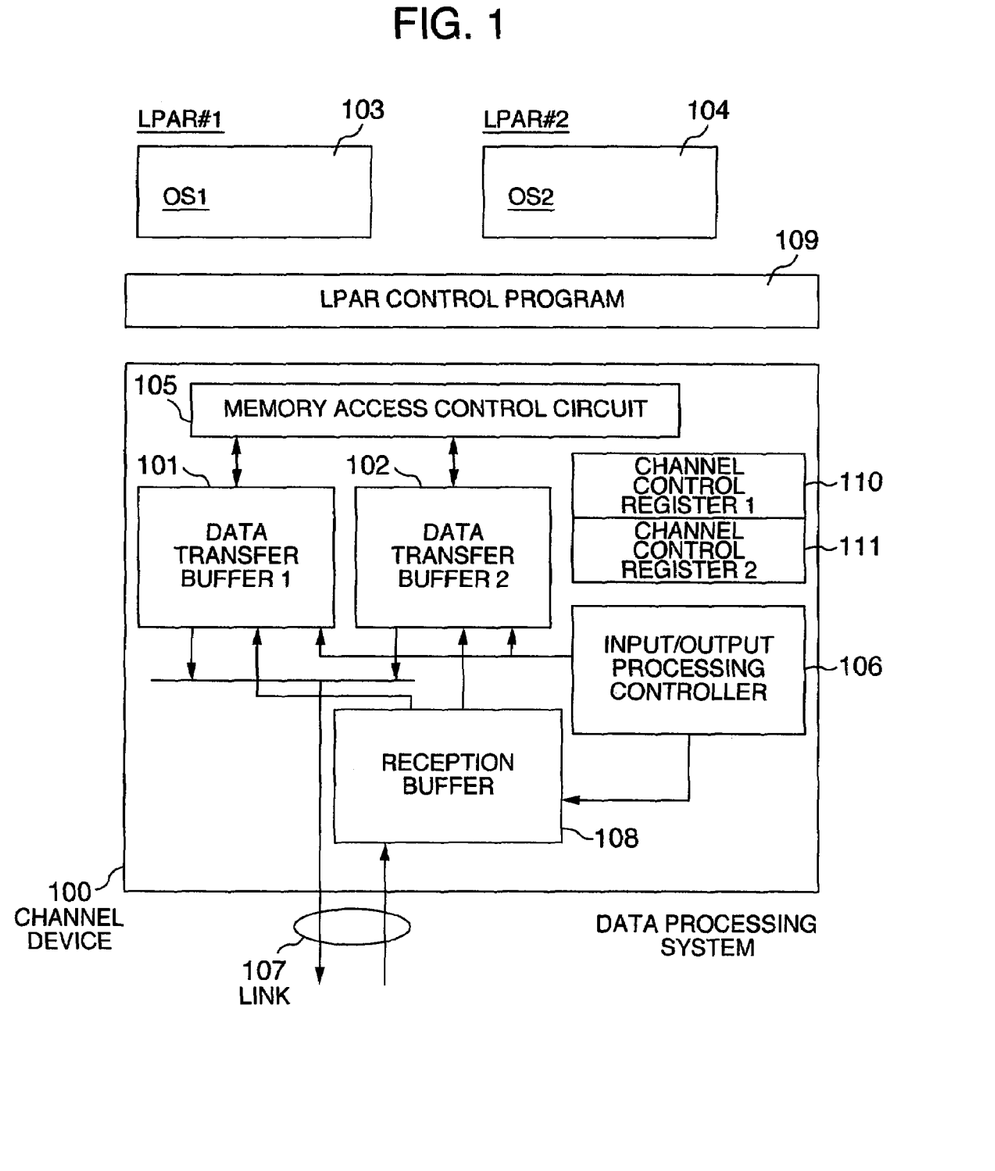
FIG. 1 is a block diagram illustrating the configuration of a data processing system to which one embodiment of the present invention is applied.

FIG. 1 illustrates one embodiment of the present invention which demonstrates features of the invention. Described in this embodiment is the sharing of one channel device by two operating systems.

A channel device 100 in the data processing system illustrated in FIG. 1 conforms to the Fibre Channel protocol (FCP) which supports the SCSI architecture. An interface on a link as Fibre Channel is a standard interface FC-AL (Fibre Channel-Arbitrated Loop) which performs I/O processing through a hub connection.

In the data processing system illustrated in FIG. 1, two LPARs, LPAR#1, LPAR#2 are initiated under the control of an LPAR control program 109, and OS1 runs on LPAR#1, while OS2 runs on LPAR#2. The channel device 100 comprises two data transfer buffers 1 (101), 2 (102), each of which comprises a data buffer for write or read data, a command buffer for SCSI commands, and a response buffer for a response frame to a SCSI command, and has a sufficient buffer capacity required for the transfer buffer to transfer data in I/O processing. The channel device 100 also comprises two channel device identifiers WWPN#1 (for example, 0x100) and WWPN#2 (for example, 0x200), each indicative of a Fibre Channel device which performs input/output processing.

Figure 4:
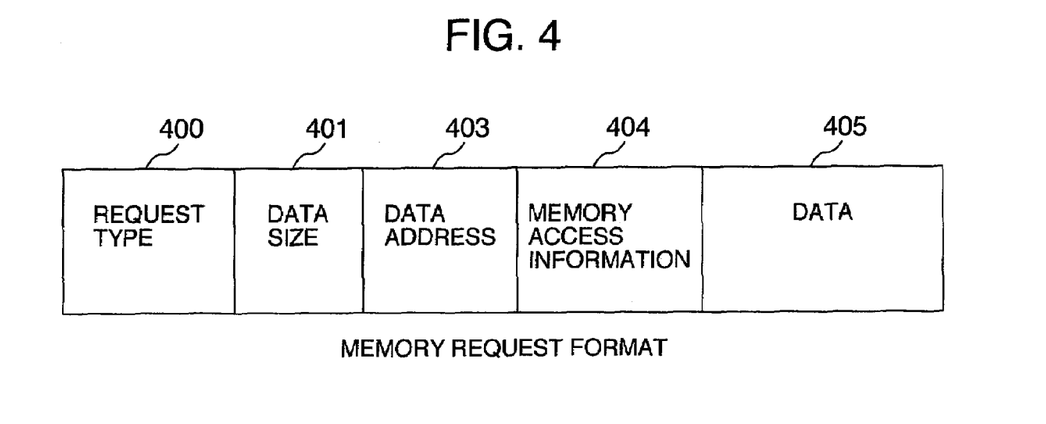
FIG. 4 is a diagram showing a memory request format.

An input/output processing controller 106 controls a plurality of data transfer processing. The input/output processing controller 106 controls the channel device 100 to use the data transfer buffer 1 (101) for the channel device identifier WWPN#1 and to use the data transfer buffer 2 (102) for the channel device identifier WWPN#2, and also controls the FCP protocol for data transfer. The input/output processing controller 106 further controls memory access processing for the plurality of data transfer buffers. FIG. 4 shows an exemplary memory request format. A data size 401 indicates the length (bytes) of data which is to be stored or fetched. Upon memory request for each data transfer buffer, which may involve a data buffering command, a SCSI command and the like in the memory access processing, a DMA (Direct Memory Access) address is set in a data address 403. Memory access information 404 indicates whether a request is made to the data transfer buffer 1 (101) or data transfer buffer 2 (102). The input/output processing controller 106 sets the memory access information 404 to "1" when a request is made for the data transfer buffer 1 (101), and to "2" when a request is made for the data transfer buffer 2 (102). For a store request, data to be stored is added to data 405. A memory access control circuit 105 in the channel device logically realizes that when the memory access information 404 indicates a memory request represented by "1," data associated with the memory request returns to the data transfer buffer 1 (101), and logically realizes that when the memory access information 404 indicates a memory request represented by "2," data associated with the memory request returns to the data transfer buffer 2 (102).

The channel device is connected to the host system through the PCI bus. Here, the memory access control circuit 105 converts the memory request into a PCI bus specification format for making a memory access.

Figure 3:
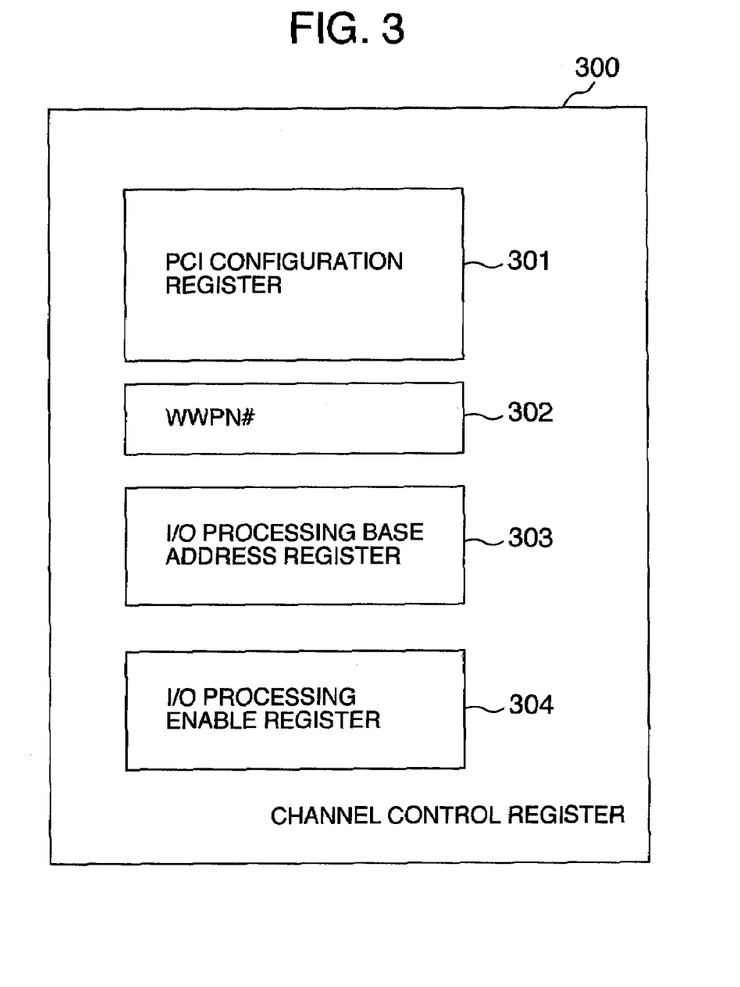
FIG. 3 is a block diagram illustrating the configuration of a channel control register in a channel device.

A channel control register 300 includes a PCI configuration register 301 which is normally possessed by a device connected to the PCI bus. The PCI configuration register 301 has a channel control register 1 (110) and a channel control register 2 (111) for controlling the channel device. FIG. 3 illustrates the configuration of the channel control register 300. Here, WWPN#302 in the channel control register 300 holds WWPN#1 (0x100) in the channel control register 1 (110), and holds WWPN#2 (0x200) in the channel control register 2 (111). An I/O processing base address register 303 and an I/O processing enable register 304 will be described later.

Figure 7:
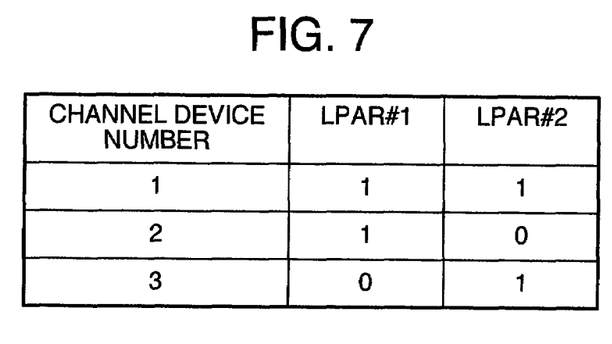
FIG. 7 is a table showing a correspondence of channel device numbers to numbers of LPARs which use channel devices.

The LPAR control program 109 assigns the channel control register to LPAR. A subroutine is provided for setting the correspondence of LPAR numbers to channel devices through manual operations or the like, such that a channel device 1 can be used from both LPAR#1 and LPAR#2, by way of example. The data processing system, responsive to the manual operations, creates a table shown in FIG. 7 for corresponding channel devices to the numbers of LPARs which use respective channel devices. In FIG. 7, the value "1" in entries belonging to an LPAR number column indicates that an associated LPAR is set to use an appropriate channel device. FIG. 7 shows that the channel device 1 is set to be used by LPAR1 and LPAR2; a channel device 2 is set to be used by LPAR1; and a channel device 3 is set to be used by LPAR2. Assume that the channel device shown in the embodiment has the channel device number 1. The LPAR control program 109 supports an algorithm which assigns LPARs labeled smaller numbers to channel control registers labeled smaller numbers, and based on the table information shown in FIG. 7, assigns the channel control register 1 (110) to LPAR#1; and the channel control register 2 (111) to LPAR#2. When OS1 on LPAR#1 performs a read or a write from or into the channel control register of the channel device 1 using a function defined by OS1, the LPAR control program 109 intercepts the function, and controls the function to executes a read or a write from or into the channel control register 1 (110). Similarly, when OS2 on LPAR#2 performs a read or a write from or into the channel control register of the channel device 1 using a function defined by OS2, the LPAR control program 109 intercepts the function and controls the function to execute a read or a write from or into the channel control register 2 (111). Under the control of the LPAR control program 109, OS1 accesses the channel control register 1 (110) alone for the channel device 1, while OS2 accesses the channel control register 2 (111) alone for the channel device 1, such that a plurality of operating systems control the channel device 1 independently of each other. With the foregoing procedure, input/output processing for OS1 appears to be performed by the channel device of WWPN#1, while input/output processing for OS2 appears to be performed by the channel device of WWPN#2.

Other than the foregoing method which causes the LPAR control program 109 to intercept the function defined by the associated operating system, the LPAR control program 109 may inform the operating system of the number of an available channel control register, so that the operating system can directly access the specified channel control register.

Next, description will be made on link initialize processing to I/O processing.

Figure 8:
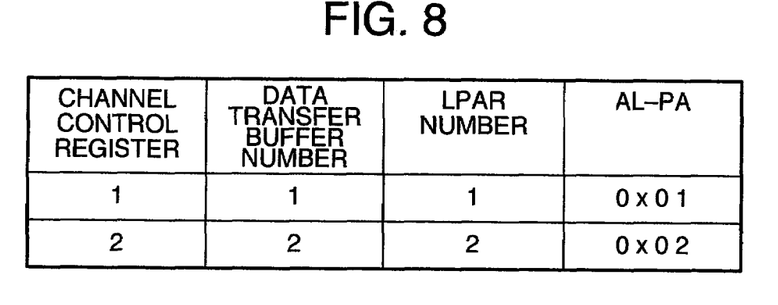
FIG. 8 is a table showing a correspondence among a channel number register, a data transfer buffer number, an LPAR number, and an arbitrated loop-physical address (AL-PA)

In the link initialize processing, the channel device 100 acquires two AL-PAs (Arbitrated Loop-Physical address), which serve as identifiers of the channel devices when data is transferred on a link, based on the FC-AL protocol. Assuming herein that AL-PA:0x01 and AL-PA:0x02 are acquired as a result of the link initialize processing, the input/output processing controller 106 assigns AL-PA:0x01 to the data transfer buffer 1 (101), and AL-PA:0x02 to the data transfer buffer 2 (102), and holds data indicative of the relationship between the data transfer buffers and AL-PAs. FIG. 8 shows a table indicating the correspondence among the channel control register, data transfer buffer, LPAR number, and AL-PA. The input/output processing controller 106 creates and holds this table.

Subsequent to the link initialize processing, the channel device 100 performs log-in processing. Here, since two AL-PAs have been acquired, the channel device 100 first executes the log-in using AL-PA:0x01 to fetch information on an I/O device connected on the Fibre Channel network. Next, the channel device 100 fetches information on a connected I/O device in a similar manner using AL-PA:0x02. For example, when an I/O device is connected to the Fibre Channel network at a port which is assigned AL-PA:0xce and WWPN#3 (for example, 0x300), the channel device 100 fetches the information such as the AL-PA of the destination port being 0xce, the identifier of the destination port being WWPN#3, and the like through the successful log-in with the ports of the I/O devices respectively for AL-PA:0x01 and AL-PA:0x02 in the log-in processing. The input/output processing controller holds the thus acquired information. The channel device 100 can execute I/O processing for the destination identified by AL-PA:0xce by the link initialize processing and log-in processing.

Figure 5:
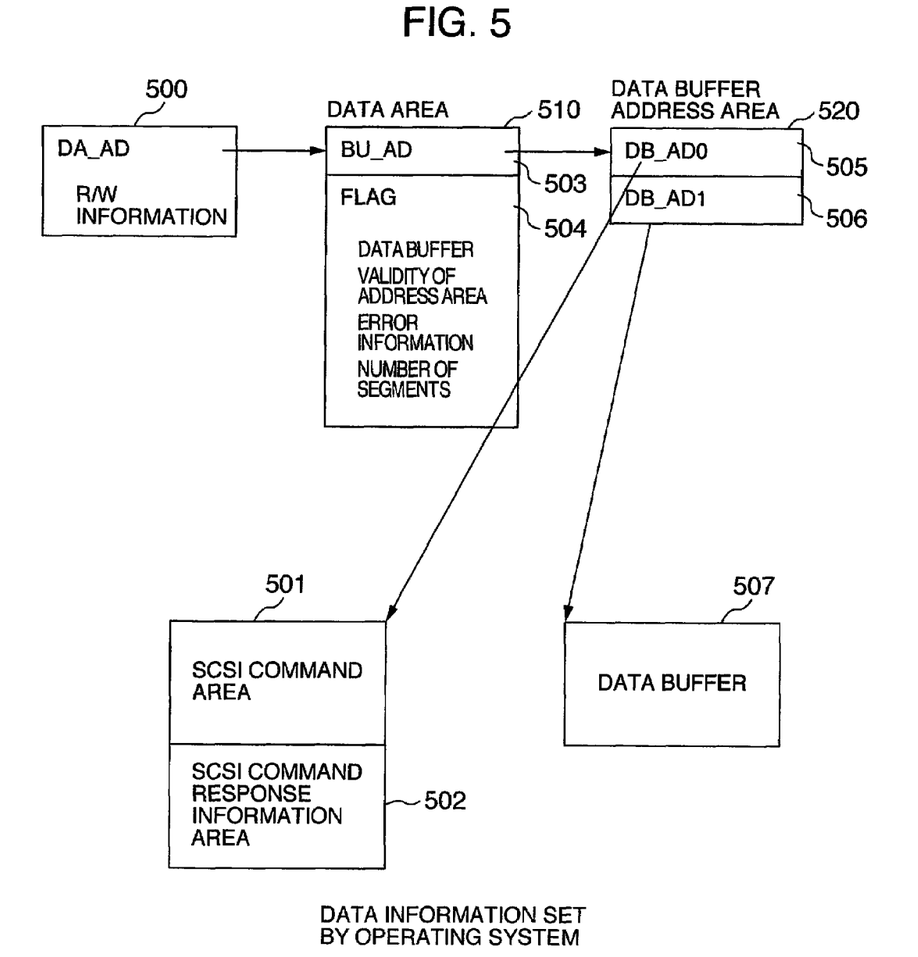
FIG. 5 is a block diagram illustrating data information for I/O processing used in the first embodiment of the present invention.

Next, the I/O processing will be described. In the I/O processing, each operating system performs SCSI I/O processing with a channel device based on a data structure shown in FIG. 5. In FIG. 5, DA_AD 500 is a 16-byte area, and includes an 8-byte physical address indicative of a data area 510 comprised of BU_AD 503 and FLAG 504, and a 1-bit R/W information byte indicative of read or write processing. The R/W information byte set at "0" indicates a read operation, and the R/W information byte set at "1" indicates a write operation. BU_AD 503 in the data area comprises an 8-byte area indicative of the starting address of a data buffer address area 520, and FLAG 504 includes information indicative of the validity of the data buffer address area 520, information indicating whether or not I/O processing has been normally completed or ended up in error; error information indicative of the type of an error when it occurs; and information indicative of the number of segments in the data buffer address area 520 comprised of a set of 8-byte segments: DB_ADs. The head DB_AD0 of the segment indicates a SCSI command area 501, and the remaining segments DB_AD1 onward indicate a data buffer 507 for a write or a read.

For initiating the channel device in the I/O processing, after the operating system has written the start address of DA_AD 500 into the I/O processing base address register 303 defined in the channel control register, the operating system writes "1" into the I/O processing enable register 304 to instruct the channel device to start the I/O processing.

Figure 9:
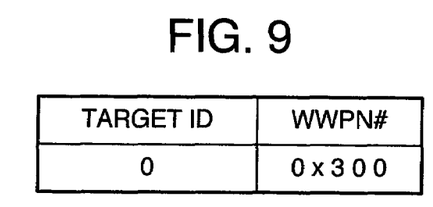
FIG. 9 is a table showing a correspondence of a target ID to destination WWPN#.

For performing the I/O processing, the operating system sets physical addresses in DA_AD 500, BU_AD 503, DB_AD0, and DB_AD1. In this embodiment, since there are two segments in the data buffer address area 520, i.e., DB_AD0 and DB_AD1 are effective, the number of segments is set to two in FLA 504, and the 256-byte SCSI command area 501 is set at a location indicated by DB_AD0 in the data buffer address area 520. The SCSI command area 501 also includes information such as a target ID indicative of a destination port which performs the I/O processing, LUN indicative of a Fibre Channel device which is subordinate to that port, and the like, other than a SCSI command. In this embodiment, the target ID is set to "0" for the destination port WWPN#3 (0x300), and the user sets a table indicative of a correspondence of the target ID to WWPN# of the destination port as shown in FIG. 9 before the system is initiated. For performing the I/O processing with the I/O device labeled WWPN#3, the operating system specifies the destination using the target ID "0." A 256-byte area following the 256-byte SCSI command area 501 is defined to be a response information area 502 for storing a response frame to a SCSI command. Also, the write data buffer 507 exists at a location indicated by the address of DB_AD1. When the data buffer 507 is made variable in length, the segment DB_AD may include information indicative of the data length of the data buffer 507. However, in this embodiment, the data buffer has a fixed length of 4 Kbytes, and the data length is not set in the segment DB_AD for simplifying the description. The operating system sets a bit indicative of the validity of the data buffer address area in FLAG 504 to initiate the I/O processing. The following description will be made on the general operation involved in the I/O processing.

For the I/O processing, OS1 sets the aforementioned data information for the target ID equal to "0" and LUN equal to "1," and sets the start address of DA_AD 5000 in the I/O processing base address register 303 in the channel control register 1 (110) of the channel device using a write function defined by OS1, and then writes "1" into the I/O processing enable register 304. Here, as described above, the LPAR control program 109 intercepts the write function defined by OS1, and the LPAR control program 109 executes the write function defined by OS1 to write into the I/O processing base address register 303 and I/O processing enable register in the channel control register 1.

Figure 10:
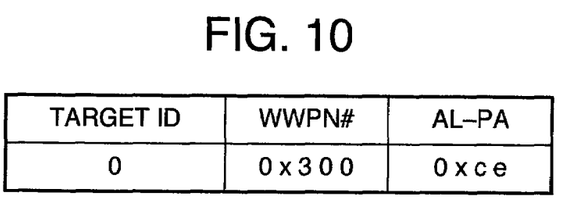
FIG. 10 is a table showing a correspondence among the target ID, destination WWPN#, and AL-PA.

Upon recognition of the initiated I/O processing from OS1, the input/output processing controller 106 in the channel device 100 fetches DA_AD 500, BU_AD 503, FLAG 504, DB_AD0 (505), and DB_AD1 (506) using the start address of DA_DA 500 of the data information set in the I/O processing base address register 303 in the channel control register 1 (110), and fetches the SCSI command 501 from the fetched data information. As a result of the fetch, the data of the SCSI command 501 is stored in the command buffer in the data transfer buffer 1 (101). The input/output processing controller 106 uses AL-PA:0x01 for an origination ID. Also, from the target ID "0," the input/output processing controller 106 uses AL-PAL:0xce for a recipient ID. FIG. 10 shows a correspondence among the target ID, WWPN#, AL-PA for a port of an I/O device in this embodiment. The input/output processing controller 106 reflects AL-PA:0x01 as the origination ID and AL-PA:0xce as the recipient ID to execute the generation of a frame corresponding to the Fibre Channel protocol, and transmission of the frame. Subsequent to the transmission of the frame for the SCSI command, the input/output processing controller 106 fetches write data pointed by DB_AD1 (506), stores the data in the data buffer in the data transfer buffer (101), and generates a frame for transmission in a manner similar to the foregoing. The destination I/O device receives the frame at a port identified by AL-PA:0xce, writes the data into a Fibre Channel device indicated by LUN in the frame, and returns a response frame indicative of the completion of the processing. The channel device 100 once receives the response frame at a reception buffer 108. The input/output processing controller 106 decodes AL-PA:0x01, which is the destination ID, within the response frame to receive the response frame in the response buffer in the data transfer buffer 1 (101). The input/output processing controller 106 stores the received response frame in the SCSI command response information area 502. After storing the response frame, the input/output processing controller 106 generates an I/O interrupt indicative of the end of the I/O processing. When an error occurs, the input/output processing controller 106 generates an i/o interrupt indicative of the end of the I/O processing after setting error information in FLAG 504. OS1 terminates the I/O processing, which was initiated for the channel device 10, by recognizing the I/O interrupt. The foregoing is the general operation from the link initialization to the end of the I/O processing in OS1. When the I/O initiation is issued from OS2, the input/output processing controller 106 uses the data transfer buffer 2 (102), and executes the I/O processing using AL-PA:0x02 for the origination ID in a frame to be communicated. Since the channel device has two each of data transfer buffers and IDs, the channel device is capable of simultaneously performing the I/O processing for two operating systems, and can also execute the I/O processing for Fibre Channel devices having the same LUN from OS1 and OS2 which are different operating systems.

An increased number of operating systems can be processed simultaneously by increasing the number of identifiers for channel devices, and the number of the data transfer buffers, and corresponding the memory access information 404 to the data transfer buffers.

Figure 6:
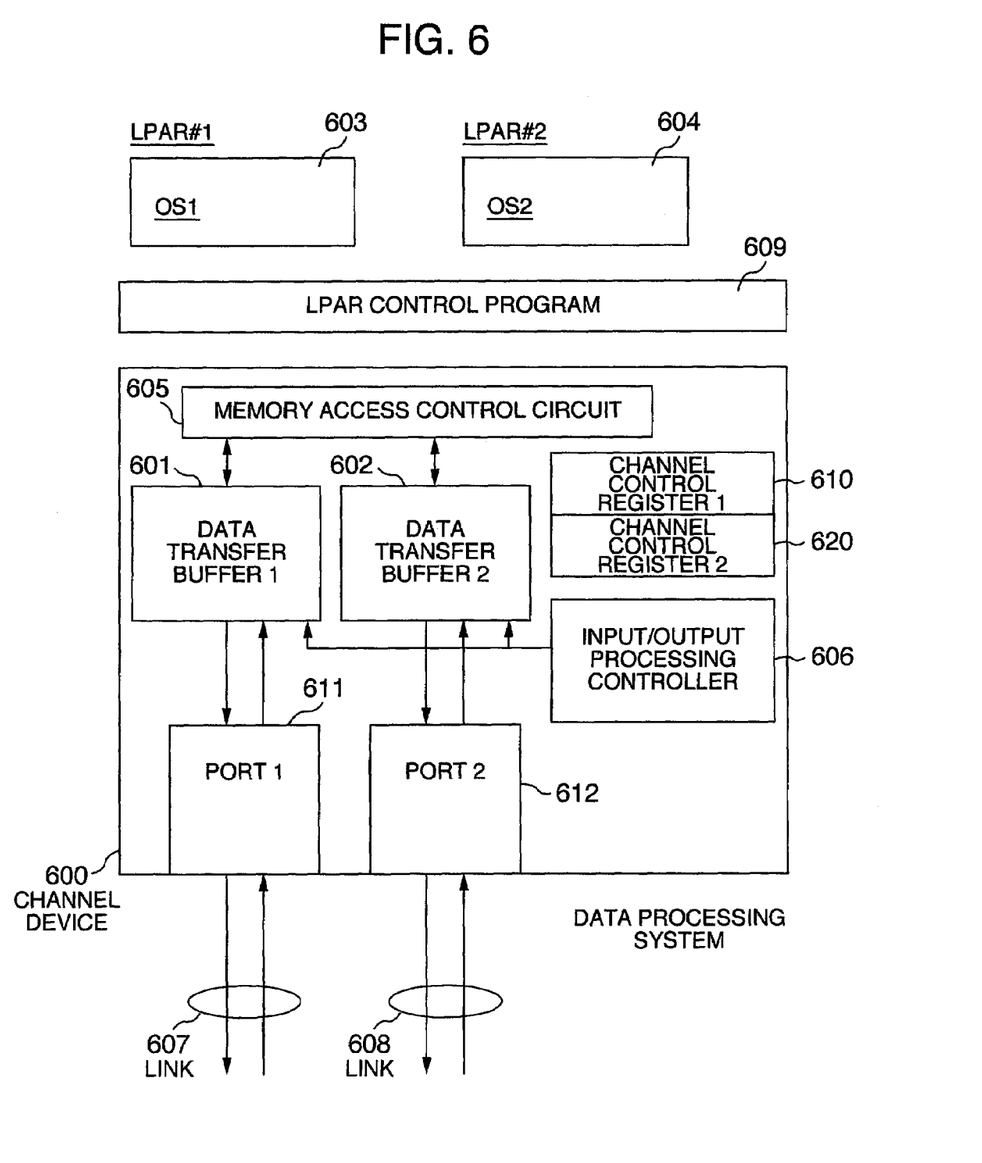
FIG. 6 is a block diagram illustrating the configuration of a data processing system to which one embodiment of the present invention is applied.

FIG. 6 illustrates a data processing system which is equipped with a multi-port channel device 600. The function and operation of OS1, OS2, LPAR control program 609, memory access control circuit 605, data transfer buffer 1 (601), data transfer buffer 2 (602), and input/output processing controller 606 are basically the same as those described in connection with FIG. 1. The data processing system illustrated in FIG. 6 differs from the data processing system illustrated in FIG. 1 in that the data transfer buffer 1 (601) is corresponded to a port 1 (611), such that a frame transmitted from the data transfer buffer 1 (601) is transferred through a port 1 (611) and a link 607, and response frames to read data and SCSI command, received at the port 1 (611), are received in a data buffer and a response buffer in the data transfer buffer 1 (601), respectively. Similarly, a frame transmitted from the data transfer buffer 2 (602) is transferred through a port 2 (612) and a link 608, such that response frames to read data and SCSI command, received at a port 2 (612), are received in a data buffer and a response buffer in the data transfer buffer 2 (602).

When the LPAR numbers are corresponded to the channel devices, the LPAR numbers are corresponded in units of ports. For example, LPAR#1 is corresponded to the port 1 (611), while LPAR#2 is corresponded to the port 2 (612). From the thus set information, the LPAR control program 609 assigns the channel control register 1 (610) to LPAR#1, and assigns the channel control register 2 (620) to LPAR#2. The rest of processing is identical to that described in connection with FIG. 1. From the foregoing, a multi-port channel device can also be shared by a plurality of operating systems.

While some embodiments according to the present invention have been described above, the present invention can provide a channel device which can be shared by a plurality of operating systems. Also, the present invention enables a channel device having multiple ports to be shared by a plurality of operating systems.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing system comprising:
a central processing unit (CPU);
a main storage having instructions that, when executed on the CPU, instructs the CPU to operate a control system controlling a plurality of operating systems executed by the CPU;
a single physical channel device transmitting data to and receiving data from an input/output device;
wherein said single physical channel device includes:
a plurality of physical ports for transmitting and receiving data, and
a plurality of storage buffers for transferring data fetched from and stored in said main storage via Direct Memory Access, each of the plurality of transfer buffers corresponding to one of the plurality of physical ports, respectively, and
wherein said control program includes: means for assigning one of the operating systems to each of the plurality of physical ports, and
wherein said single physical channel device is configured to control each of the plurality of physical ports and includes input/output processing control means for independently controlling transmission and reception of data for input/output processing initiated from a certain operating system for each of the plurality of physical ports to which the operating systems are assigned to control said plurality of physical ports.

* * * * *